US008276090B2

(12) United States Patent
Chen et al.

(10) Patent No.: US 8,276,090 B2
(45) Date of Patent: *Sep. 25, 2012

(54) AUTOMATIC REFERENCE NOTE GENERATOR (75) Inventors: Yen-Fu Chen, Austin, TX (US); John W. Dunsmoir, Round Rock, TX (US)

(73) Assignee: Google Inc., Mountain View, CA (US)

( * ) Notice: Subject to any disclaimer, the term of this patent is extended or adjusted under 35 U.S.C. 154(b) by 809 days.

This patent is subject to a terminal disclaimer.

(21) Appl. No.: 11/961,813

(22) Filed: Dec. 20, 2007

(65) Prior Publication Data
US 2008/0098317 A1  Apr. 24, 2008

Related U.S. Application Data (62) Division of application No. 10/755,834, filed on Jan. 12, 2004, now Pat. No. 7,340,685.

(51) Int. Cl.
*G06F 17/00* (2006.01)
(52) U.S. Cl. ......... 715/770; 715/769; 715/255; 715/206
(58) Field of Classification Search .......... 715/205–208, 715/230–234, 266, 769, 770, 255
See application file for complete search history.

(56) References Cited

U.S. PATENT DOCUMENTS

| 4,688,033 A | 8/1987 | Carini |
| 4,890,247 A | 12/1989 | Sarrine |
| 5,097,418 A | 3/1992 | Nurse et al. |
| 5,283,856 A | 2/1994 | Gross et al. |
| 5,367,623 A | 11/1994 | Iwai |
| 5,426,583 A | 6/1995 | Uribe-Echebarria Diaz De Mendibil |
| 5,440,678 A | 8/1995 | Eisen et al. |
| 5,544,300 A | 8/1996 | Skarbo et al. |
| 5,579,521 A | 11/1996 | Shearer et al. |
| 5,583,761 A | 12/1996 | Chou |
| 5,586,025 A | 12/1996 | Tsuji et al. |

(Continued)

FOREIGN PATENT DOCUMENTS
JP    2001250005    9/2001
(Continued)

OTHER PUBLICATIONS

USPTO; recent correspondence after Apr. 15, 2010 in related U.S. Appl. No. 10/692,173, filed by Yen-Fu Chen on Oct. 23, 2003.

(Continued)

*Primary Examiner* — Thu V Huynh
(74) *Attorney, Agent, or Firm* — Young Basile Hanlon & MacFarlane, P.C.

(57) ABSTRACT

A reference note is automatically generated in an electronic document when directly quoting information from another electronic document by receiving a first user-selected insertion point or replacement area to a destination electronic document by receiving a user selection of text content to be transferred from a source user interface to the first insertion point or replacement area; automatically copying the selected content to a transfer buffer without requiring the user to return to the first user interface; automatically capturing and recording one or more source reference data items corresponding to the selected content simultaneously with or subsequent to automatically copying the selected content to a transfer buffer; and automatically generating in the destination electronic document at least one reference note such as a footnote, an endnote, a table of references entry, or a bibliographical entry containing the recorded source reference data items.

12 Claims, 9 Drawing Sheets

U.S. PATENT DOCUMENTS

| | | | |
|---|---|---|---|
| 5,590,266 | A | 12/1996 | Carson |
| 5,614,703 | A | 3/1997 | Martin et al. |
| 5,666,552 | A | 9/1997 | Greyson et al. |
| 5,678,039 | A | 10/1997 | Hinks et al. |
| 5,706,458 | A | 1/1998 | Koppolu |
| 5,765,156 | A | 6/1998 | Guzak et al. |
| 5,781,192 | A | 7/1998 | Kodimer |
| 5,801,693 | A | 9/1998 | Bailey |
| 5,864,830 | A | 1/1999 | Armetta |
| 5,897,643 | A * | 4/1999 | Matsumoto ............... 715/234 |
| 5,897,650 | A | 4/1999 | Nakajima et al. |
| 5,924,099 | A | 7/1999 | Guzak et al. |
| 5,929,854 | A * | 7/1999 | Ross .......................... 715/783 |
| 5,956,736 | A | 9/1999 | Hanson et al. |
| 5,964,834 | A | 10/1999 | Crutcher |
| 5,974,372 | A | 10/1999 | Barnes |
| 5,995,103 | A | 11/1999 | Ashe |
| 6,023,679 | A | 2/2000 | Acebo |
| 6,032,134 | A | 2/2000 | Weissman |
| 6,044,135 | A | 3/2000 | Katz |
| 6,070,244 | A | 5/2000 | Orchier et al. |
| 6,108,668 | A | 8/2000 | Bates et al. |
| 6,177,939 | B1 | 1/2001 | Blish et al. |
| 6,192,378 | B1 | 2/2001 | Abrams |
| 6,195,420 | B1 | 2/2001 | Tognazzini |
| 6,212,577 | B1 | 4/2001 | Stern et al. |
| 6,236,955 | B1 | 5/2001 | Summers |
| 6,240,430 | B1 | 5/2001 | Deike et al. |
| 6,262,852 | B1 | 7/2001 | Takahashi |
| 6,266,683 | B1 * | 7/2001 | Yehuda et al. ............. 715/234 |
| 6,268,852 | B1 | 7/2001 | Lindhorst et al. |
| 6,272,505 | B1 * | 8/2001 | De La Huerga ........... 715/235 |
| 6,289,330 | B1 | 9/2001 | Jannarone |
| 6,309,305 | B1 | 10/2001 | Kraft |
| 6,313,855 | B1 | 11/2001 | Shuping |
| 6,324,498 | B1 | 11/2001 | Wajda |
| 6,360,205 | B1 | 3/2002 | Iyengar et al. |
| 6,381,567 | B1 | 4/2002 | Christensen et al. |
| 6,401,118 | B1 | 6/2002 | Thomas |
| 6,449,616 | B1 | 9/2002 | Walker et al. |
| 6,453,268 | B1 | 9/2002 | Carney et al. |
| 6,477,503 | B1 | 11/2002 | Mankes |
| 6,406,941 | B2 | 12/2002 | Tognazzini |
| 6,496,841 | B1 | 12/2002 | Tognazzini |
| 6,560,608 | B1 | 5/2003 | Tomm et al. |
| 6,567,973 | B1 | 5/2003 | Yamamoto et al. |
| 6,587,837 | B1 | 7/2003 | Spagna et al. |
| 6,591,094 | B1 | 7/2003 | Bentley et al. |
| 6,735,701 | B1 | 5/2004 | Jacobsen |
| 6,773,266 | B1 | 8/2004 | Dornbush et al. |
| 6,789,252 | B1 | 9/2004 | Burke et al. |
| 6,807,668 | B2 | 10/2004 | Stern et al. |
| 6,873,957 | B1 | 3/2005 | Chen |
| 6,891,551 | B2 | 5/2005 | Keely et al. |
| 6,901,367 | B1 | 5/2005 | Berstis |
| 6,993,473 | B2 | 1/2006 | Cartus |
| 7,036,092 | B2 | 4/2006 | Sloo et al. |
| 7,167,904 | B1 | 1/2007 | Devarajan et al. |
| 7,171,468 | B2 | 1/2007 | Yeung et al. |
| 7,185,274 | B1 | 2/2007 | Rubin et al. |
| 7,293,242 | B2 * | 11/2007 | Cossey et al. ............. 715/770 |
| 7,310,781 | B2 * | 12/2007 | Chen et al. ................ 715/769 |
| 7,328,166 | B1 | 2/2008 | Geoghegan |
| 7,340,685 | B2 | 3/2008 | Chen et al. |
| 7,346,853 | B2 | 3/2008 | Chen |
| 7,475,390 | B2 | 1/2009 | Berstis |
| 7,478,336 | B2 * | 1/2009 | Chen et al. ................ 715/770 |
| 7,496,230 | B2 | 2/2009 | Chen |
| 7,503,012 | B2 | 3/2009 | Chen |
| 2001/0016825 | A1 | 8/2001 | Pugliese |
| 2001/0049613 | A1 | 12/2001 | Gramann |
| 2002/0002452 | A1 | 1/2002 | Christy et al. |
| 2002/0052893 | A1 * | 5/2002 | Grobler et al. ............. 707/509 |
| 2002/0054092 | A1 | 5/2002 | Hedloy |
| 2002/0082877 | A1 | 6/2002 | Schiff |
| 2002/0156672 | A1 | 10/2002 | Burko |
| 2002/0186255 | A1 | 12/2002 | Shafron |
| 2002/0188670 | A1 | 12/2002 | Stringham |
| 2003/0004760 | A1 | 1/2003 | Schiff |
| 2003/0007007 | A1 | 1/2003 | Hinegardner |
| 2003/0036929 | A1 | 2/2003 | Vaughan |
| 2003/0040900 | A1 | 2/2003 | D'Agostini |
| 2003/0061145 | A1 | 3/2003 | Norrid |
| 2003/0125927 | A1 | 7/2003 | Seme |
| 2003/0135476 | A1 | 7/2003 | Holland et al. |
| 2003/0200078 | A1 | 10/2003 | Luo |
| 2004/0027382 | A1 | 2/2004 | Kuehn et al. |
| 2004/0039995 | A1 * | 2/2004 | Kuwata et al. ............. 715/530 |
| 2004/0150215 | A1 | 8/2004 | King |
| 2004/0181753 | A1 | 9/2004 | Michaelides |
| 2004/0205493 | A1 | 10/2004 | Simpson |
| 2004/0250215 | A1 | 12/2004 | Chen et al. |
| 2004/0257346 | A1 | 12/2004 | Ong |
| 2004/0260535 | A1 | 12/2004 | Chen |
| 2004/0267823 | A1 | 12/2004 | Shapiro |
| 2005/0091603 | A1 | 4/2005 | Chen |
| 2005/0102629 | A1 | 5/2005 | Chen |
| 2005/0102630 | A1 | 5/2005 | Chen |
| 2005/0132280 | A1 * | 6/2005 | Broman et al. ............. 715/513 |
| 2005/0154992 | A1 | 7/2005 | Chen |
| 2005/0154993 | A1 | 7/2005 | Chen |
| 2005/0154994 | A1 | 7/2005 | Chen |
| 2005/0155017 | A1 | 7/2005 | Berstis et al. |
| 2006/0224903 | A1 | 10/2006 | Ginter et al. |
| 2006/0253330 | A1 | 11/2006 | Maggio et al. |
| 2006/0282319 | A1 | 12/2006 | Maggio |
| 2008/0072144 | A1 | 3/2008 | Chen |
| 2008/0098317 | A1 | 4/2008 | Chen |
| 2008/0300859 | A1 | 12/2008 | Chen |
| 2009/0030672 | A1 | 1/2009 | Berstis |
| 2009/0044140 | A1 * | 2/2009 | Chen et al. ................ 715/770 |

FOREIGN PATENT DOCUMENTS

| | | |
|---|---|---|
| WO | WO 02071259 | 9/2002 |
| WO | WO 02071259 | 12/2002 |

OTHER PUBLICATIONS

Apperley, Mark, et al.; "Breaking the copy/paste cycle: the stretchable selection tool", published: 2000, downloaded from U.S. Appl. No. 10/692,173, on Apr. 16, 2009.

U.S. Appl. No. 10/455,159, downloaded from http://www.uspto.gov on Apr. 16, 2009.

U.S. Appl. No. 10/692,173, downloaded from http://www.uspto.gov on Apr. 16, 2009.

U.S. Appl. No. 10/703,012, downloaded from http://www.uspto.gov on Apr. 16, 2009.

U.S. Appl. No. 10/755,831, downloaded from http://www.uspto.gov on Apr. 16, 2009.

Courter, et al. Mastering Microsoft Office 2000 Professional Edition, (c) 1999, SYBEX, pp. 35, 37.

IBM, Technical Disclosure Bulletin "Multiple Item On-line Clipboard", Jul. 1992, p. 425.

Microsoft Corp., "OLE Concepts and Requirements Overview", three pages.

USPTO; recent notice of allowance in related patent application, U.S. Appl. No. 12/245,279, filed Oct. 3, 2008, by Viktors Berstis.

USPTO; recent examination correspondence (Reply Brief in Appeal of Dec. 27, 2010) in related U.S. Appl. No. 10/692,173, filed Oct. 23, 2003 by Yen-Fu Chen, currently on Appeal.

USPTO; recent Notice of Allowance in related U.S. Appl. No. 12/245,279, filed Oct. 3, 2008 by Viktors Berstis.

USPTO; recent examination correspondence in related U.S. Appl. No. 10/692,173, filed Oct. 23, 2003 by Yen-Fu Chen, currently on Appeal.

USPTO; recent examination correspondence in related U.S. Appl. No. 11/947,350, filed Nov. 29, 2007 by Yen-Fu Chen.

USPTO;Recent Examination Correspondence from a Related U.S. Appl. No. 10/692,173, filed Oct. 23, 2003 by Yen-Fu Chen.

USPTO;Recent Examination Correspondence from a Related U.S. Appl. No. 11/947,350, filed Nov. 29, 2007 by Yen-Fu Chen.

USPTO; Recent Examination Correspondence from a Related U.S. Appl. No. 12/245,279, filed Oct. 3, 2008 by Viktors Berstis.

USPTO; Recent Examination Correspondence from a Related U.S. Appl. No. 12/251,567, filed Oct. 15, 2008 by Yen-Fu Chen.

USPTO; Recent Examination Correspondence from a Related U.S. Appl. No. 12/192,391, filed Aug. 15, 2008 by Yen-Fu Chen.

USPTO; recent examination correspondence including Notice of Allowance and Rule 312 Amendment in related U.S. Appl. No. 12/245,279, filed by Viktors Berstis on Oct. 3, 2008.

"PROject MT Ltd.—UDDI Business (Provider) Details" downloaded from http://www.bindingpoint.com/ on Nov. 4, 2003. 2 pages.

Akers; "LogMedia Translate Version 2.0"; 2002; pp. 220-223.

AMA Citation Style by Long Island University, downloaded on Nov. 6, 2003 from http://www.liu/edu/cwis/cwp/library/workshop. 3 pages.

APA Citation Style by Long Island University, downloaded on Nov. 6, 2003 from http://www.liu.edu/cwis/cwp/library/workshop. 4 pages.

Chicago Citation Style by Long Island University, downloaded on Nov. 6, 2003 from http://www.liu.edu/cwis/cwp/library/workshop. 3 pages.

Clipboard Magic, v4.1 by Cyber-Matrix, http://www.filebuzz.com/fileinfo/317/Clipboard.sub.—Magic.html, retrieved Apr. 7, 2008 1 page.

Screen shot from "AltaVista's Babel Fish Translation Service", performed from http://babelfish.altavista.com/babelfish on Oct. 30, 2003. 1 page.

Cybermatrix, "Clipboard Magic [TM]: Free Multiple Storage Clipboard Utility", Version 4.01, retrieved on Apr. 7, 2008 from http://www.cybermatrix.com/clipboard.sub.—magic.html, 3 pages. (please note "version history" link in Product Quick Links box, upper right portion of first page).

Cybermatrix, "Clipboard Magic Version History", retrieve on Apr. 7, 2008 from http://www.cybermatrix.com/changes/cmagic.html, (please note v4.01 release date of Nov. 22, 2005 at top of first page). 4 pages.

File Buzz, "Clipboard Magic v4.01", retrieved on Apr. 7, 2008 from http://www.filebuzz.com/fileinfo/317/Clipboard.sub.—Magic.html, 2 pages (please note copyright date at bottom of second page).

John Kaufeld, Access 97 for Windows for Dummies, Copyright (c) 1996, IDG Books Worldwide, Inc. pp. 24, 68, 77, 82, 89, 299, 300.

Lingua Translator Web Service—XML Web Service Details downloaded from http://www.bindingpoint.com/ on Nov. 4, 2003. 2 pages.

Miller et al.; "Syncrhonizing Clipboards of Multiple Computers", ACM, 1999, vol. 1.1, pp. 65-66.

MLA Citation Style by Long Island University, downloaded on Nov. 6, 2003 from http://www.liu.edu/cwis/cwp/library/workshop. 5 pages.

TechSmith Corp, SnagIT User's Guide, 2002, 42 pages.

Turabian Citation Style by Long Island University, downloaded on Nov. 6, 2003 from http://www.liu.edulcwis/cwp/library/workshop. 3 pages.

University of Kentucky, WS.sub.—FTP Quick REference Guide, Apr. 3, 2000, http://www.uky.edu/SCS/documents/Win-wsftp/win-wsftppf.html. 1 pages.

* cited by examiner

AUTOMATIC REFERENCE NOTE GENERATOR

CROSS-REFERENCE TO RELATED APPLICATIONS

Claiming Benefit Under 35 U.S.C. 120

This application is a divisional application of U.S. patent application Ser. No. 10/755,834, filed on Jan. 12, 2004, now U.S. Pat. No. 7,340,685 which was related to application Ser. No. 10/455,159, filed on Jun. 5, 2003, by Yen-Fu Chen.

FEDERALLY SPONSORED RESEARCH AND DEVELOPMENT STATEMENT

This invention was not developed in conjunction with any Federally sponsored contract.

MICROFICHE APPENDIX

Not applicable.

INCORPORATION BY REFERENCE

Related U.S. patent application Ser. Nos. 10/755,834 and 10/455,159, filed on Jan. 12, 2004, and Jun. 5, 2003, respectively, both by Yen-Fu Chen, are incorporated by reference in their entireties, including figures, to the present disclosure.

BACKGROUND OF THE INVENTION

1. Field of the Invention

This application is a divisional application of U.S. patent application Ser. No. 10/755,834, filed on Jan. 12, 2004, currently under allowance, and which was related to application Ser. No. 10/455,159, filed on Jun. 5, 2003, now U.S. Pat. No. 7,310,781, both of which were filed by Yen-Fu Chen. This invention relates to the arts of computer user interfaces and data exchange between program entities such as instances of programs in a multi-tasking computer system. This invention relates especially to computer methods for transferring information from one file to another.

2. Background of the Invention

Modern multi-tasking computers provide a variety of user interfaces for controlling multiple application programs and system functions which operate simultaneously. Some of the most widely used multi-tasking computer systems are personal computers ("PC") running a multi-tasking operating system ("OS") such as International Business Machines' ("IBM") OS/2™ or AIX™, Microsoft Windows™, and Apple Computer's MacOS™. Other operating systems may be used with personal computers as well as larger computers such as enterprise-class computers, such as UNIX, Sun Microsystems' Solaris™, Hewlett Packard's HP-UX™, and the "open sourced" LINUX. Smaller computing platforms such as held-held computers, personal digital assistants ("PDA"), and advanced wireless telephones may run operating systems targeted for such hardware including Palm Computing's PalmOS™ and Microsoft's Windows™. Additionally, there are many "proprietary" and less widely-used computing platforms and operating systems which also allow users to control and run multiple programs and system functions simultaneously.

Many of these systems will use tabs, icons, windows, frames, pages and special key combinations to allow a user to switch between user interfaces ("UI") for each program and system function which is being executed, or to start or stop the execution of a program or system function. For example, in a personal computer running MS Windows™, the user may first start a web browser program running using several methods (e.g. double clicking an icon on the desktop, selecting the program from a Start Programs list, operating a "hot key", etc.), and then may start a document editor program using similar methods. Each program establishes a user interface such as its own "window". The user can then control a program by selecting its window using one of several available methods, such as selecting a button or icon on a command bar, activating a "task list" and selecting a program, etc. As a result, a user can start and run many programs simultaneously, periodically switching between their user interfaces to accomplish work or entertainment tasks as needed. Other computing systems provide similar basic user control capabilities, albeit with a variety of user controls to switch between programs and system functions.

Users often wish to copy or transfer information or "content" from one program or system function to another. For example, a user may be preparing an invoice for a client using a word processor program, but may also be simultaneously using a database or spreadsheet program to perform various calculations. Using "copy and paste" functions of the application programs and the operating system, the user may select information from a source program (e.g. the spreadsheet), and "paste" it into the destination program (e.g. the invoice being edited). Such a process is so common place in computer users' daily lives that it is rote, albeit each user may know several sequences of actions for several computers which he or she commonly uses (e.g. one process on his home PC, another on his PDA, and another on his networked terminal at work). These memorized methods may typically include several steps of clicking on icons, dropping down lists, highlighting information, and using navigation controls within program UI's.

Figure 1:
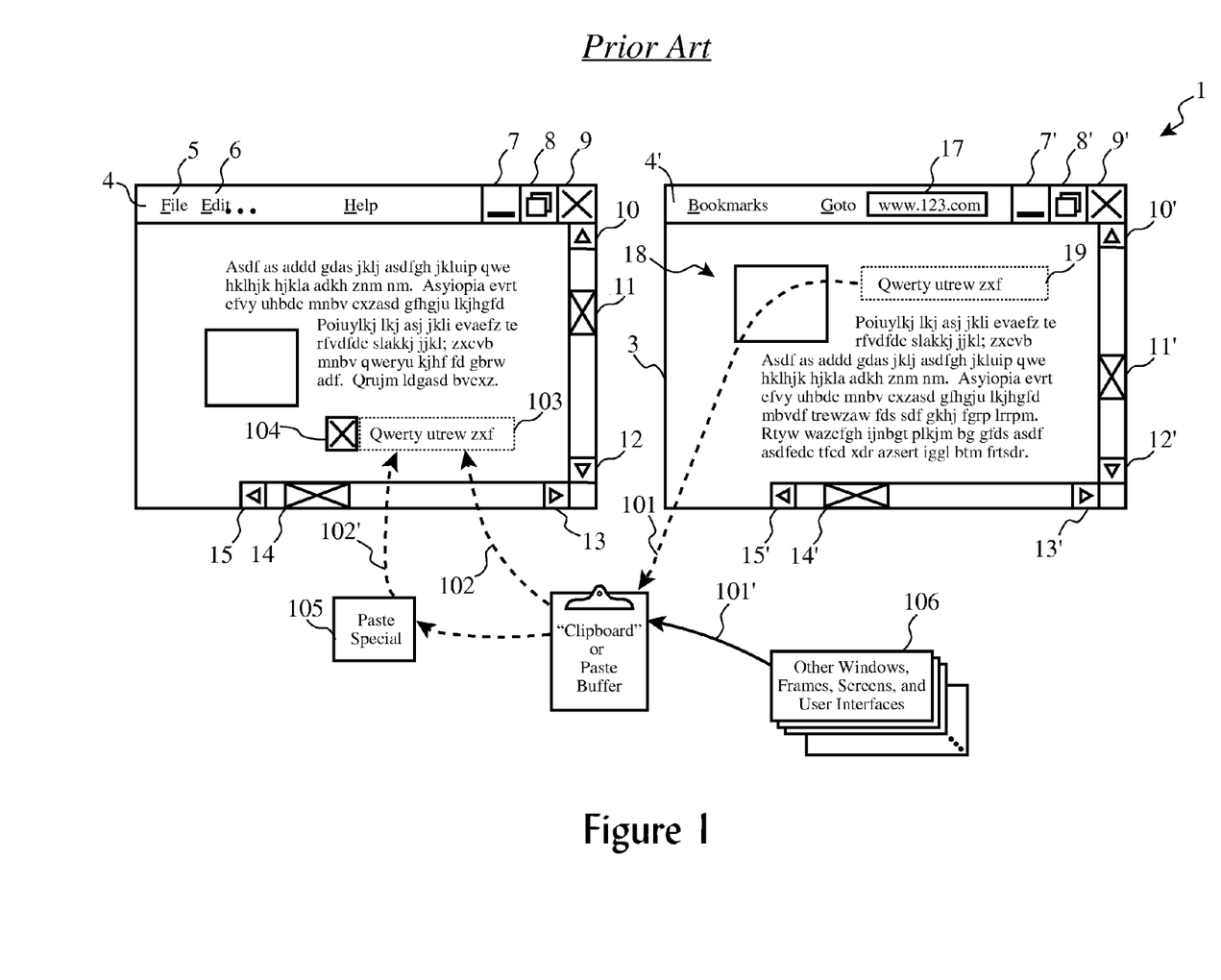
FIG. 1 illustrates the typical user interfaces and system actions of "cutting and pasting" information from one application program to another.

For example, turning to FIG. 1, a "windows" style user interface is depicted to illustrate a process of "copying" information from a web browser program to a word processor file via a "clipboard" memory. In this system, each program provides a window (2, 3, 104) which can be closed (9, 9') to end the program, maximized (8, 8') to view the full UI for that program, or minimized (7, 7') to leave the program running but deactive the UI (e.g. clear the UI window from the screen). In this example, these controls are located in a command bar (4, 4') along the top of the UI window, but many other variations are known in the art.

Each UI window also typically has navigation controls such as left panning (15, 15'), right panning (13, 13'), and horizontal scroll (14, 14') controls, as well as up panning (10, 10'), down panning (12, 12'), and vertical scroll (11, 11'), for viewing areas of information and content not completely viewable in the UI. Information, icons, text, graphics, etc., are shown or displayed within (16, 18) the UI window according to the scroll and panning control settings. More recently, the term "content" (16, 18) has been used to collectively refer to all types of information which may be displayed or presented in a user interface, including but not limited to text, graphics, still images, animated images, video, audio, and hyperlinks.

Now suppose for the purpose of our example, the user has started a word processing program which provides a first UI window (2), and a web browser which provides a second UI window (3). Also suppose that the user is researching information on the Internet using the web browser while authoring a paper which is being edited simultaneously using the word processor.

In this example, the user has found information (19) at a hypothetical web address (17) that he wants to "quote" in his or her paper. So, the user must first move the cursor (104) in the word processor to select an insertion point for the information, then must switch to the web browser UI, select the text (19) in the source content, operate a "copy" command in the web browser UI which copies (101) the content into a buffer (100) such as a "clipboard", switch back to the word processor UI, and operate a "paste" or "insert" command, which results in the copied content (19) being inserted into the destination document at the point of insertion (103). The user can repeat this process for many different program UI's (106).

In some software and hardware configurations, the copy buffer may be provided within a suite of application programs which are "tightly coupled" or related. Such suites cooperate with each other in ways not possible with software programs provided by differing suppliers. In many cases, however, the operating system provides a buffer function which is generally accessible by all programs, such as the clipboard in the MS Windows™ operating system.

Also, in some situations, the original content with its original format may not be acceptable by the destination program, and as such, a specialized paste or insertion function (105) may be provided by the destination program or operating system which converts the content to a form useful by the destination program. For example, text copied from a web page may include color, size, font, style, and hyperlink reference information embedded in the base Hyper Text Markup Language ("HTML") of the source web page. However, not all word processors are able to interpret all of these special codes and identifiers, so a "paste as plain text" option may be provided by a converter or translator (105) function.

So, to illustrate the complexity and tedious nature of such ordinary operations, we present the steps in full to accomplish this example scenario of simply transferring a block of formatted text from a web page to a word processor program, starting from a point where the user is editing the destination document in the word processor:

(a) navigate to the insertion point in the destination document using the word processor UI window controls (e.g. multiple clicks on scroll, panning or page up/page down keys);
(b) optionally select text or content in the destination document which is to be replaced;
(c) switch to the web browser UI window (e.g. click on an icon in a task bar, activate a task list and pick a running web browser program, etc.);
(d) navigate in the web browser UI window to find the text or content desired to be transferred into the document (e.g. use panning, scrolling, or page up/page down keys);
(e) select the source content or text (e.g. click-and-drag over the content to highlight it);
(f) transfer the content to a copy buffer (e.g. click on "Edit" command, select "copy" option or type Alt-E, Alt-C);
(g) switch back to the word processor UI window (e.g. (e.g. click on a icon in a task bar, activate a task list and pick a running web browser program, etc.); and
(h) operate a "paste" command in the word processor UI window (e.g. click on "Edit" command, select "paste" option or type Alt-E, Alt-P).

Each of these operations may actually require several steps (clicking, scrolling, selecting, typing, etc.), so this minimal process may represent 7 to 25 actual user actions. This process must be repeated for each block of text or content to be transferred from multiple program UI windows (106), and additional steps may be necessary to achieve a "special paste", as described above. Also, if the same text or content is to be inserted into the destination document for file at multiple locations, the last few operations of this process (h) in addition to some navigation actions must by performed by the user.

As a result, consolidating information from multiple sources of information may be extremely tedious, frustrating, and tiresome using the currently available methods and apparatuses provided in such computing systems. Some systems may provide notably more "user friendly" or intuitive methods, while other systems are much more difficult and "clunky" to use.

Figure 2:
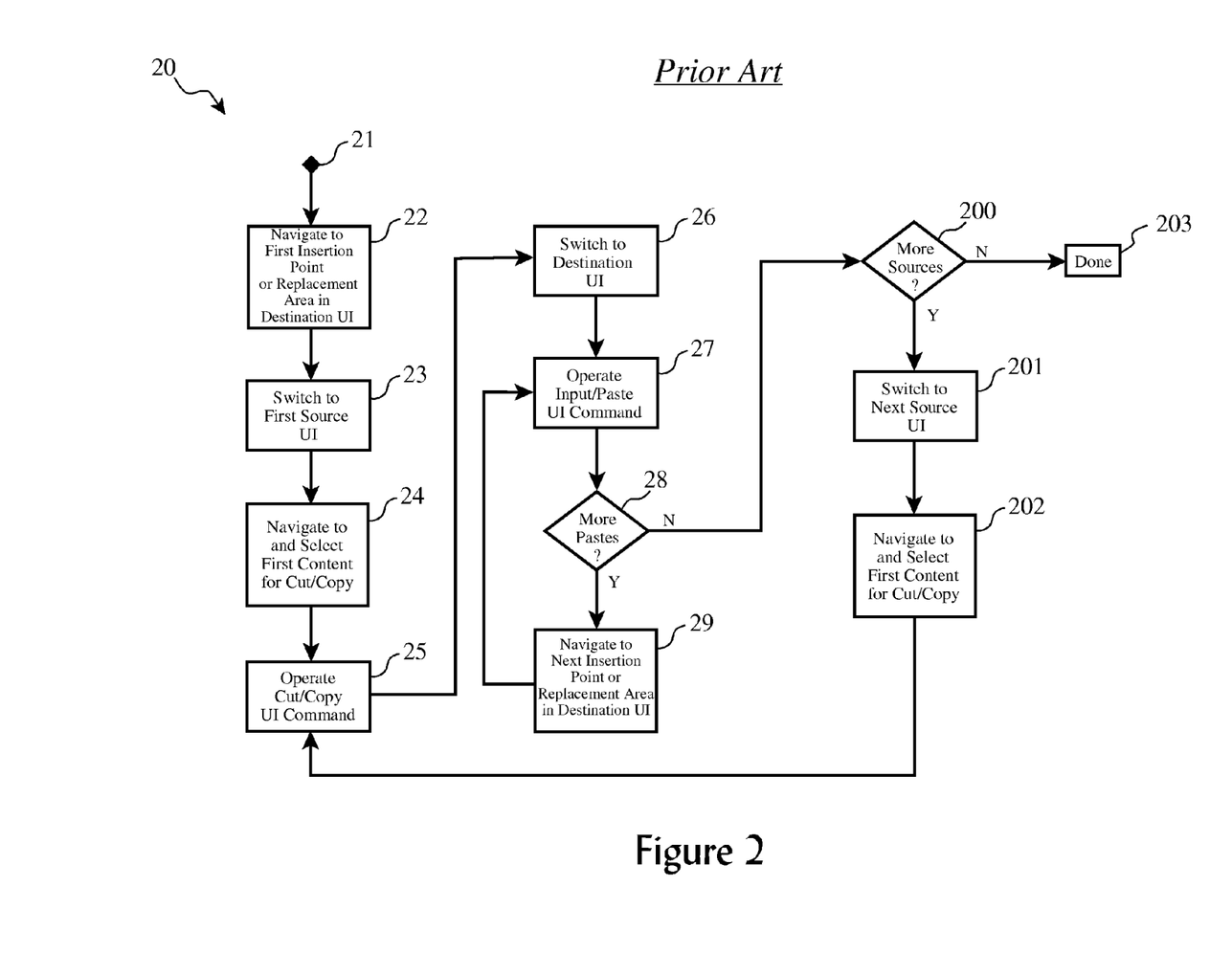
FIG. 2 shows the typical logical process in a general manner for transferring content from one application program or system function to another.

Turning to FIG. 2, this process is generalized. Starting at a point or time (21) when the user is actively working with the destination program UI, the user must navigate (22) within the present document, file, or other computer resource to a point where the content insertion is to be made, including selecting any content which is to be replaced. Then, the user must switch (23) to the UI of the first source of information, navigate (24) to the first source content to be transferred, select that content, and operate (25) a copy or cut control in the first source UI.

Next, the user must switch (26) back to the destination UI, and operate (27) an insert or paste command in that UI. If (28) the user wants to insert or paste that content into multiple destinations, the user must navigate (29) to each destination and operate (27) the paste or insert command in the destination program UI, until all insertions have been made for that source information.

If (200) the user desires to transfer information from other points in the same source, or from other sources, the user must repeatedly switch (201) to a source UI, navigate to a source content point, select source information, operate (25) a copy or cut operation, switch (26) back to the destination UI, and paste or insert (27) the content, until all information has been transferred.

Implied, but not shown in detail, in this generalization of the process can be multiple user actions for each general step. Optionally, options such as translation or conversion of the content may be necessary, which requires additional user actions (e.g. the "paste as plain text" example).

So, it is not inconceivable that in the course of authoring a paper using a word processor and information from several sources, the user may have to perform hundreds of tedious actions, commands, selections, navigation operations, etc.

In this paradigm, certain conventions have evolved into place which only moderately simplify or reduce the burden of such operations. For example, performing a "cut" operation usually deletes the selected source content from the source file, and places a copy of it into the transfer buffer, sometimes overwriting the current contents of the transfer buffer. A "copy" operation typically leaves the selected information unchanged in the source and only places a copy of the information in the transfer buffer. Additionally, in the destination UI, a "paste" or "insert" command may copy the contents of transfer buffer to a selected point in the destination document or file, leaving a copy in the transfer buffer for additional pastes or insertions.

In some programs, a "paste special", "import from clipboard", or similar command may be available with several translation options to perform a minimal conversion process on each transfer. However, even though the user may be performing the same "paste special" command over and over, the typical UI does not memorize or "learn" this process, so the user is forced to respond to a number of redundant options and dialogs on each paste operation.

The same user interface conventions are followed by many computer systems not only for content or information within a computer resource such as text and graphics within a file, but also for resources (e.g. files, shortcuts, icons, mappings, etc.) within a computing environment (e.g. file system, directories, folders, etc.). For example, when working with a MS Windows™ operating system and running the Windows Explorer program, a user may select a file, directory or folder to move, execute an "Edit-Cut" command sequence, navigate to another directory or drive, and execute an "Edit-Paste" command to move the selected resource to the new destination. Similarly, by selecting the source resource, executing a copy command, and then executing a paste command to one or more destinations, the original resource is not changed but copies of it are deposited at the destination points. Further, by selecting and copying a source resource, then selecting a destination resource, replacement of the destination resource may be accomplished.

As such, editing tools which are available can be used to readily copy information from one computer source to another, which enables a user to quickly and easy compile an original document, paper, or article which contains verbatim quotes from a plurality of sources such as web sites, word processor files, etc.

When incorporating such information from sources other than the author himself or herself, it is customary to note the source of the quoted information an a manner such as a footnote, and end note, or an entry in a bibliography or table of references.

Many word processors have facilities for allowing a user to mark text in a document, enter information regarding the source of the information, and automatically generating an end note, footnote, or table entry based on the information provided by the user. While this automatic reference note generation function greatly simplifies the task of creating the notes and placing them in the proper places in the document (e.g. at the foot of a page where the passage is reprinted), it has two problems. First, it requires the user to take careful notes as to the source of the quoted information, such as a file or web site address. Second, it relies upon the integrity of the author to properly identify the source of the information.

Because cutting and pasting between one online source of information to another is so easy to do with word processors, web browsers, etc., it poses a special problem for online learning systems, as well. For example, consider a situation where a student is taking a test online through a distance learning arrangement, and that one portion of the test requires the student to author a short essay. In one manner of administrating the test, the student may be provided an HTML web form in which there is a box to type his or her essay composition, with the form being transmitted by HTTP to an instructor for grading. In another manner of administering the test, the student may be allowed to use a word processor to author a short paper for the essay, and to email the paper to the instructor for grading.

In both of these test administration scenarios, and in many variants of them, it is difficult for the instructor to know or determine if the student has improperly plagiarized information contained in his or her answer by cutting and pasting from other computer sources (e.g. cutting and pasting information from an online encyclopedia or web site into the form field or the word processor document).

SUMMARY OF THE INVENTION

Users are enabled to cut and paste information from a plurality of sources to one or more destinations in a more convenient manner, as previously described in the related patent application, while simultaneously automatically collecting the source reference information (e.g. author, time, date, file name, document name, web site address, etc.) for each information item transferred into the destination(s). The present invention can then supply this collected source reference information to word processor functions which automatically generate end notes, foot notes, table of reference entries, and bibliography entries, thereby allowing the user to more easily and accurately produce such reference notes. According to another aspect of the present invention, the composition which has been created by inclusion of one or more tracked sources of information may be automatically updated or "refreshed" by the invention through accessing the original points of source information elements and transferring them into the composition as previously performed, except with current or fresh information from the sources.

Additionally, in another manner of use and operation, an administrator of an online learning experience such as a test or assignment is provided with an automatically generated report of quoted source reference information from a student who has cited or quoted information from an online source through cut-and-paste or copy operations. The student may or may not be aware of the monitoring and reporting of his or her information transfer activities, according to options of the invention. Similarly to the collection of footnote and end note information which is performed during the cutting and pasting operations, the same source reference information is collected during completion of an online learning activity and used to generate a report which is then provided to the administrator of the online learning activity. This information can allow the administrator to determine if the student has violated a rule of conduct through disallowed plagiarism, or has not fully disclosed the sources of his or her information in situations where quoting of other parties is allowed.

BRIEF DESCRIPTION OF THE DRAWINGS

The following detailed description when taken in conjunction with the figures presented herein provide a complete disclosure of the invention.

DESCRIPTION OF THE INVENTION

The present invention is preferably realized as computer-executable code such as compiled software, scripts, or portable programs, in conjunction with existing application programs, operating systems, and computer hardware. For purposes of completeness, we first present a generalized view in FIGS. 3 and 4 of typical computer hardware and software which is suitable for realization of our invention. Many variations of these computer platform details may be made without departing from the scope of the invention, as will be readily recognized by those skilled in the art.

Common computing platforms such as personal computers, web servers, and web browsers, as well as proprietary computing platforms, may be used in realization of the present invention. These common computing platforms can include, but are not limited to, personal computers as well as portable computing platforms, such as personal digital assistants ("PDA"), web-enabled wireless telephones, and other types of personal information management ("PIM") devices.

Therefore, it is useful to review a generalized architecture of a computing platform which may span the range of implementation, from a high-end web or enterprise server platform, to a personal computer, to a portable PDA or web-enabled wireless phone.

Figure 3:
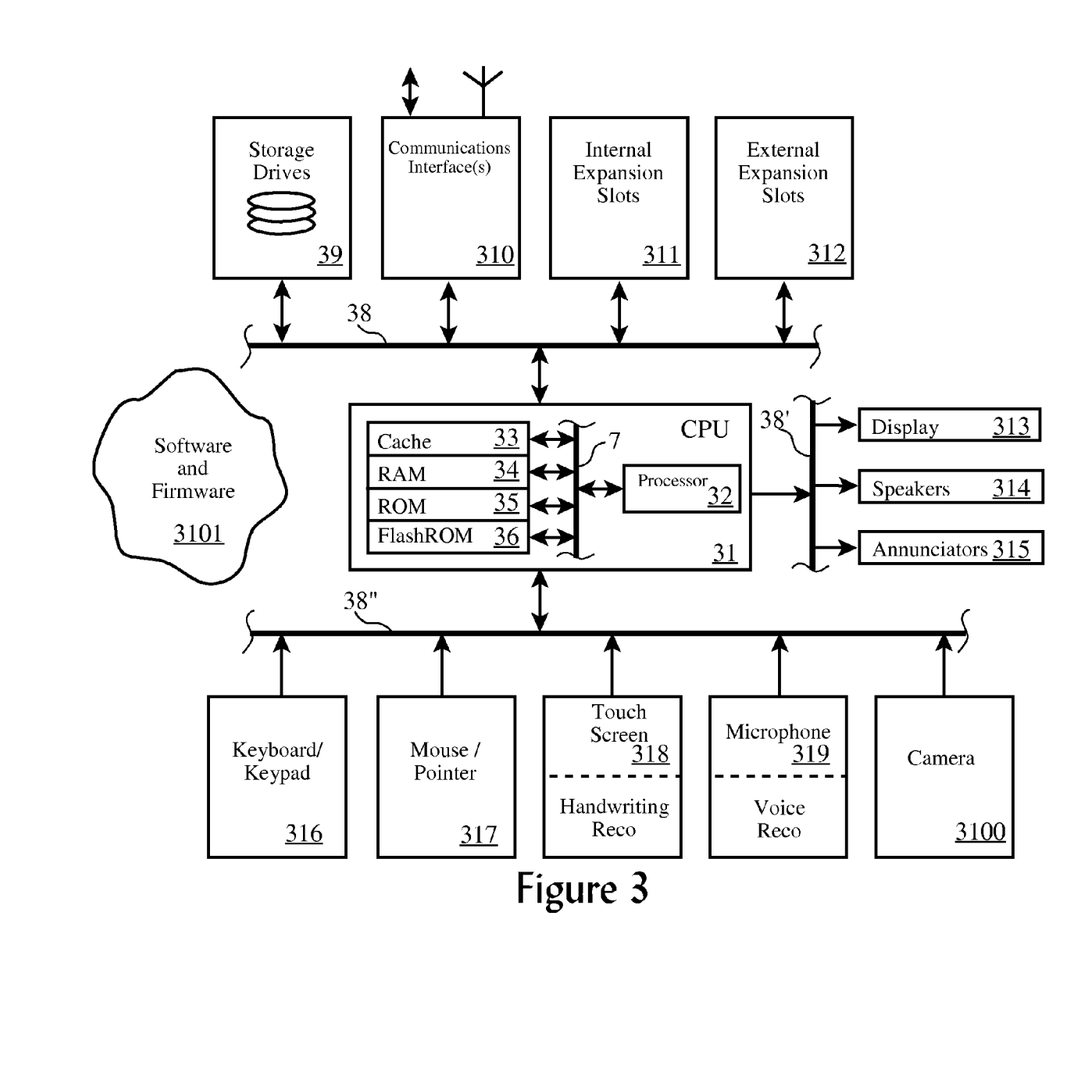
FIG. 3 depicts a generalized computing platform architecture, such as a personal computer, server computer, personal digital assistant, web-enabled wireless telephone, or other processor-based device.

Turning to FIG. 3, a generalized architecture is presented including a central processing unit (31) ("CPU"), which is typically comprised of a microprocessor (32) associated with random access memory ("RAM") (34) and read-only memory ("ROM") (35) devices. Often, the CPU (31) is also provided with cache memory (33) and programmable FlashROM (36) devices. The interface (37) between the microprocessor (32) and the various types of CPU memory devices is often referred to as a "local bus", but also may be a more generic or industry standard bus.

Many computing platforms are also provided with one or more storage drives (39), such as a hard-disk drives ("HDD"), floppy disk drives, compact disc drives (CD, CD-R, CD-RW, DVD, DVD-R, etc.), and proprietary disk and tape drives (e.g., Iomega Zip™ and Jaz™, Addonics SuperDisk™, etc.), and the disk and tape media they read, write, or both read and write. Additionally, some storage drives may be accessible over a computer network. For the purposes of this disclosure, such storage drives, tape and disk media, and memory devices will be referred to collectively as "computer-readable tangible storage devices".

Many computing platforms are provided with one or more communication interfaces (310), according to the function intended of the computing platform. For example, a personal computer is often provided with a high speed serial port (RS-232, RS-422, etc.), an enhanced parallel port ("EPP"), and one or more universal serial bus ("USB") ports. The computing platform may also be provided with a local area network ("LAN") interface, such as an Ethernet card, and other high-speed interfaces such as the High Performance Serial Bus IEEE-1394.

Computing platforms such as wireless telephones and wireless networked PDA's may also be provided with a radio frequency ("RF") interface with antenna, as well. In some cases, the computing platform may be provided with an infrared data arrangement (IrDA) interface, too.

Computing platforms are often equipped with one or more internal expansion slots (311), such as Industry Standard Architecture ("ISA"), Enhanced Industry Standard Architecture ("EISA"), Peripheral Component Interconnect ("PCI"), or proprietary interface slots for the addition of other hardware, such as sound cards, memory boards, and graphics accelerators.

Additionally, many units, such as laptop computers and PDA's, are provided with one or more external expansion slots (312) allowing the user the ability to easily install and remove hardware expansion devices, such as PCMCIA cards, SmartMedia cards, and various proprietary modules such as removable hard drives, CD drives, and floppy drives.

Often, the storage drives (39), communication interfaces (310), internal expansion slots (311) and external expansion slots (312) are interconnected with the CPU (31) via a standard or industry open bus architecture (38), such as ISA, EISA, or PCI. In many cases, the bus (38) may be of a proprietary design.

A computing platform is usually provided with one or more user input devices, such as a keyboard or a keypad (316), and mouse or pointer device (317), and/or a touch-screen display (318). In the case of a personal computer, a full size keyboard is often provided along with a mouse or pointer device, such as a track ball or TrackPoint™. In the case of a web-enabled wireless telephone, a simple keypad may be provided with one or more function-specific keys. In the case of a PDA, a touch-screen (318) is usually provided, often with handwriting recognition capabilities.

Additionally, a microphone (319), such as the microphone of a web-enabled wireless telephone or the microphone of a personal computer, is supplied with the computing platform. This microphone may be used for simply reporting audio and voice signals, and it may also be used for entering user choices, such as voice navigation of web sites or auto-dialing telephone numbers, using voice recognition capabilities.

Many computing platforms are also equipped with a camera device (3100), such as a still digital camera or full motion video digital camera.

One or more user output devices, such as a display (313), are also provided with most computing platforms. The display (313) may take many forms, including a Cathode Ray Tube ("CRT"), a Thin Flat Transistor ("TFT") array, or a simple set of light emitting diodes ("LED") or liquid crystal display ("LCD") indicators.

One or more speakers (314) and/or enunciators (315) are often associated with computing platforms, too. The speakers (314) may be used to reproduce audio and music, such as the speaker of a wireless telephone or the speakers of a personal computer. Enunciators (315) may take the form of simple beep emitters or buzzers, commonly found on certain devices such as PDAs and PIMs.

These user input and output devices may be directly interconnected (38', 38") to the CPU (31) via a proprietary bus structure and/or interfaces, or they may be interconnected through one or more industry open buses such as ISA, EISA, PCI, etc.

The computing platform is also provided with one or more software and firmware (3101) programs to implement the desired functionality of the computing platforms.

Figure 4:
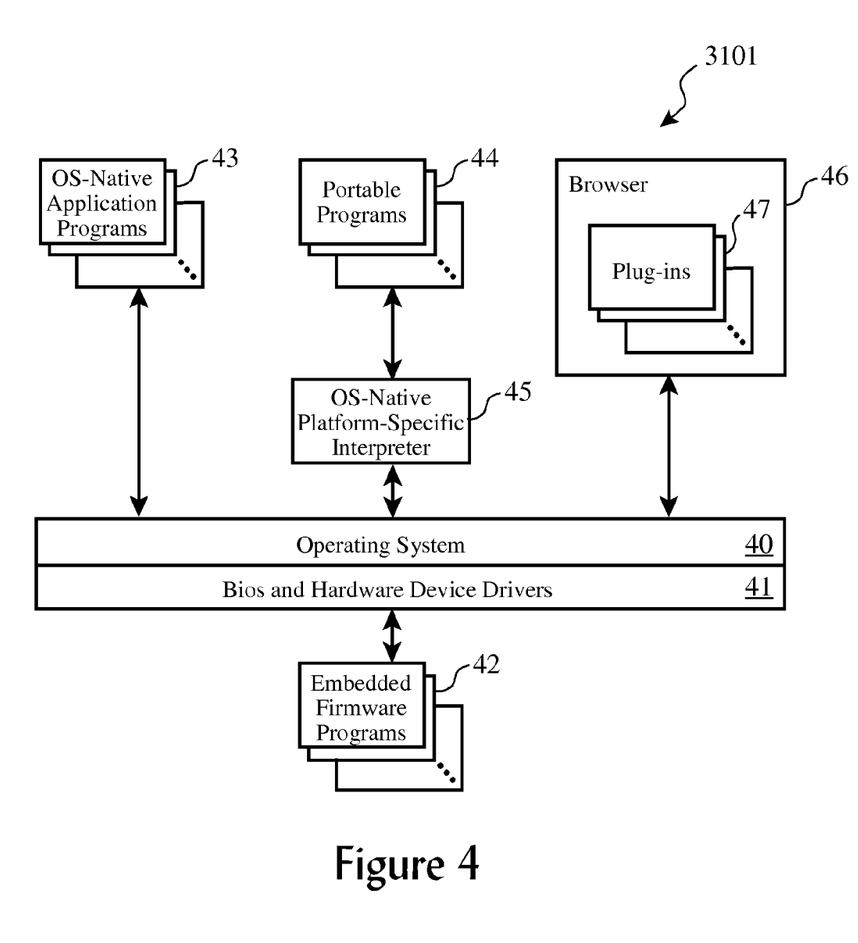
FIG. 4 shows a generalized organization of software and firmware associated with the generalized architecture of FIG. 1.

Turning to now FIG. 4, more detail is given of a generalized organization of software and firmware (3101) on this range of computing platforms. One or more operating system ("OS") native application programs (43) may be provided on the computing platform, such as word processors, spreadsheets, contact management utilities, address book, calendar, email client, presentation, financial and bookkeeping programs.

Additionally, one or more "portable" or device-independent programs (44) may be provided, which must be interpreted by an OS-native platform-specific interpreter (45), such as Java™ scripts and programs.

Often, computing platforms are also provided with a form of web browser or microbrowser (46), which may also include one or more extensions to the browser such as browser plug-ins (47).

The computing device is often provided with an operating system (40), such as Microsoft Windows™, UNIX, IBM OS/2™, LINUX, MAC OS™ or other platform specific operating systems. Smaller devices such as PDA's and wireless telephones may be equipped with other forms of operating systems such as real-time operating systems ("RTOS") or Palm Computing's PalmOS™.

A set of basic input and output functions ("BIOS") and hardware device drivers (41) are often provided to allow the operating system (40) and programs to interface to and control the specific hardware functions provided with the computing platform.

Additionally, one or more embedded firmware programs (42) are commonly provided with many computing platforms, which are executed by onboard or "embedded" microprocessors as part of the peripheral device, such as a micro controller or a hard drive, a communication processor, network interface card, or sound or graphics card.

As such, FIGS. 3 and 4 describe in a general sense the various hardware components, software and firmware programs of a wide variety of computing platforms, including but not limited to personal computers, PDAs, PIMs, web-enabled telephones, and other appliances such as WebTV™ units. As such, we now turn our attention to disclosure of the present invention relative to the processes and methods preferably implemented as software and firmware on such a computing platform. It will be readily recognized by those skilled in the art that the following methods and processes may be alternatively realized as hardware functions, in part or in whole, without departing from the spirit and scope of the invention.

We now turn our attention to description of the method of the invention and it's associated components. In general, the present invention provides the user the ability to follow this process:

1. Declare destination content area for pasting or insertion in a destination UI;
2. Enable highlighting or selecting content to automatic copy selected information and store it in memory (e.g. buffer/clipboard) for future usage, as well as to automatically insert or paste the selected information into the pre-designated destination area;
3. Switch to source UI's, and simply highlight or select the desired content portion(s) which triggers dynamic insertion/concatenation into the declared content field.

Using the present invention, advantages over presently available methods and user interfaces are:

1. User-friendly: the invention utilizes maneuvering techniques with which users are already familiar, such as double mouse clicks, dragging to highlight, etc.;
2. Convenient: the invention provides a user a new way of selecting destination for paste operations, and offers a quicker way of copy/paste by eliminating keyboard strokes, mouse clicks, navigation and toggling between different program windows and UI's.
3. Intuitive: Users can learn or "discover" that in this new mode, content highlighting triggers copy/paste effortlessly, immediately seeing the results of the highlighting action, and proceeding to experiment with various ways of applying and exploring this invention.
4. Time-Saving: Reduces time to compile information from multiple sources by making copy-paste user interface methods much more efficient.
5. Increases productivity: By reducing fatigue and tediousness in application program user interfaces, users are allowed to produce more accurate results with less effort in less time.

Figure 5:
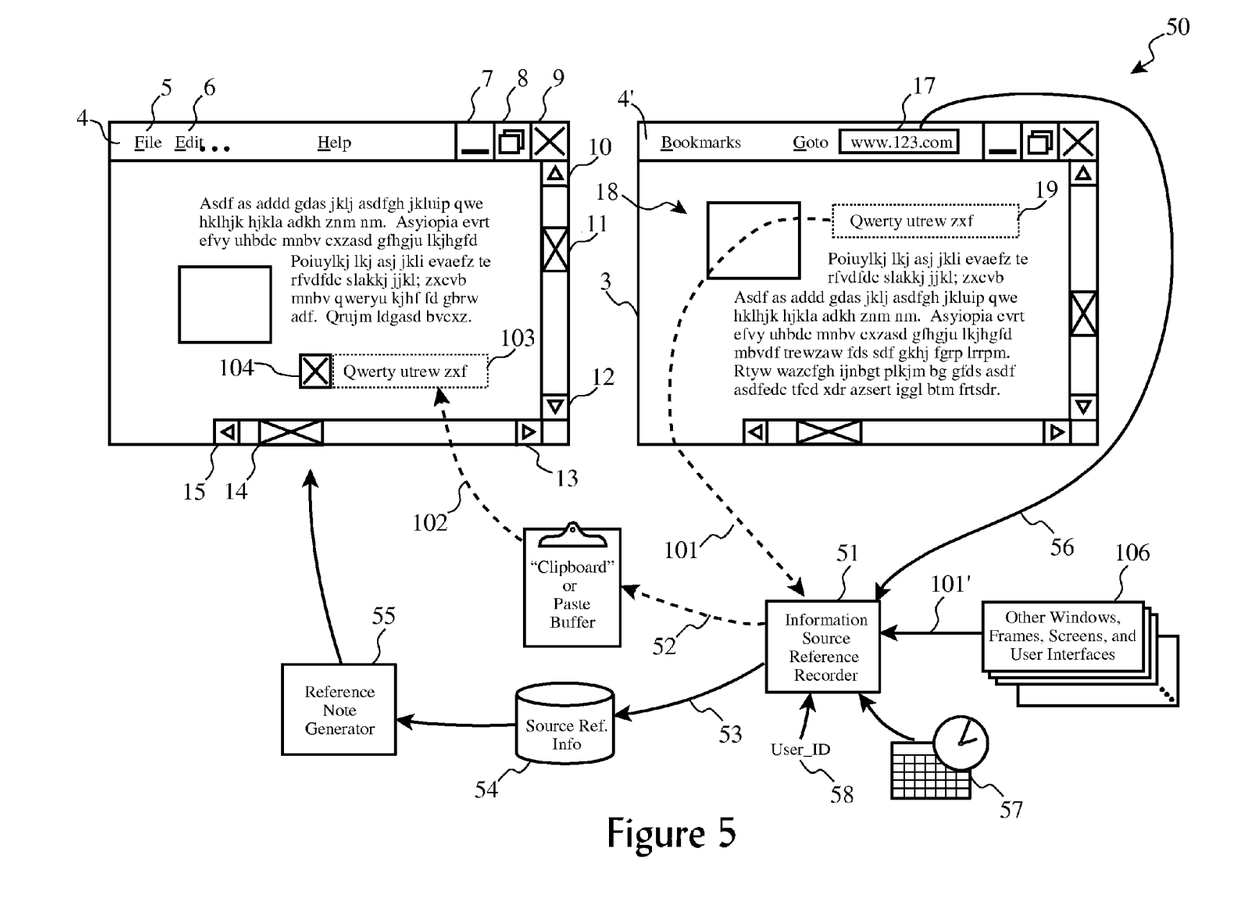
FIG. 5 illustrates our process of collecting source reference information during copying, cutting and pasting, and similar information transfer operations, which is then used to automatically generate accurate and complete reference notes.

Turning now to FIG. 5, our process (50) of collecting and recording (51) information regarding the source for each information element transferred from a source to the transfer buffer is shown. In this example, the information element is a text string (19), which is being transferred from a web browser window (3) pointed to an address (17) www.123.com. The source reference recorder (51) intercepts the transfer of the selected information elements on their way from the source to the clipboard or transfer buffer, and records the system date and time (57), user identification (58), and a source indicator (56) such as a file name, path name, URL or address. The user ID (58) can be obtained through a number of conventional means, such as having the user log into the machine or accessing a user profile through an operating system call. The system date and time (57) can also be obtained through a number of conventional means, including making an operating system function call or maintaining an internal clock and date value. Information can also be parsed from source code or obtained from session objects, cookies, etc.

The source indicator (56) can also be obtained through several conventional means, such as by implementing or querying an Object Linking Environment ("OLE") link, examining HTML meta tags, XML header information, PDF file header information, proprietary document embedded authorship and file indicators (e.g. MS Word author fields, creation dates, etc.). The source author (if available) and publication date can be obtained through similar means, as well.

Table 1 shows an example source reference record corresponding to this example transfer, recorded in an eXtensible Markup Language ("XML") style format. Records can be made in a variety of alternate formats, as well, such as text, binary, database entries, etc.

TABLE 1

Example XML Source Reference Record

```
<source_reference>
    <from> www.123.com </from>
    <source_author> Jim Smith </source_author>
    <source_pub_date> Dec. 19, 2001 </source_pub_date>
    <source_content> Qwerty utrew zxf </source_content>
    <date _of_copy> April 15, 2004 </date_of_copy>
    <time_of_copy> 18:36:03 </time_of_copy>
    <user> Danny </user>
    <destination> page 1, line 8, "my_essay.doc" </destination>
</source_reference>
```

These records of reference information are stored (54), preferably in a simple database structure such as an IBM DB2 structure, and are provided to a reference note generator (55), such as an footnote, end note, table of reference, or bibliography tool associated with a word processor. Alternatively, the reference note generator (55) may be provided as a standalone utility program. The information shown in Table 1 can be formatted in a variety of ways according to the intended use, and according to a custom or standard style manual such as Turabian's Manual for Writers or the Chicago Manual of Style, or such as profession and industry-specific style guides including the Publication Manual of the American Psychological Association, the MLA Handbook for Writers of Research Papers, or the American Medical Association Manual of Style.

For this example, a "Chicago" style foot note may be created to read as follows:

[1]Smith, Jim. 2001. Available from World Wide Web: <http://www.123.com>

Figure 8:
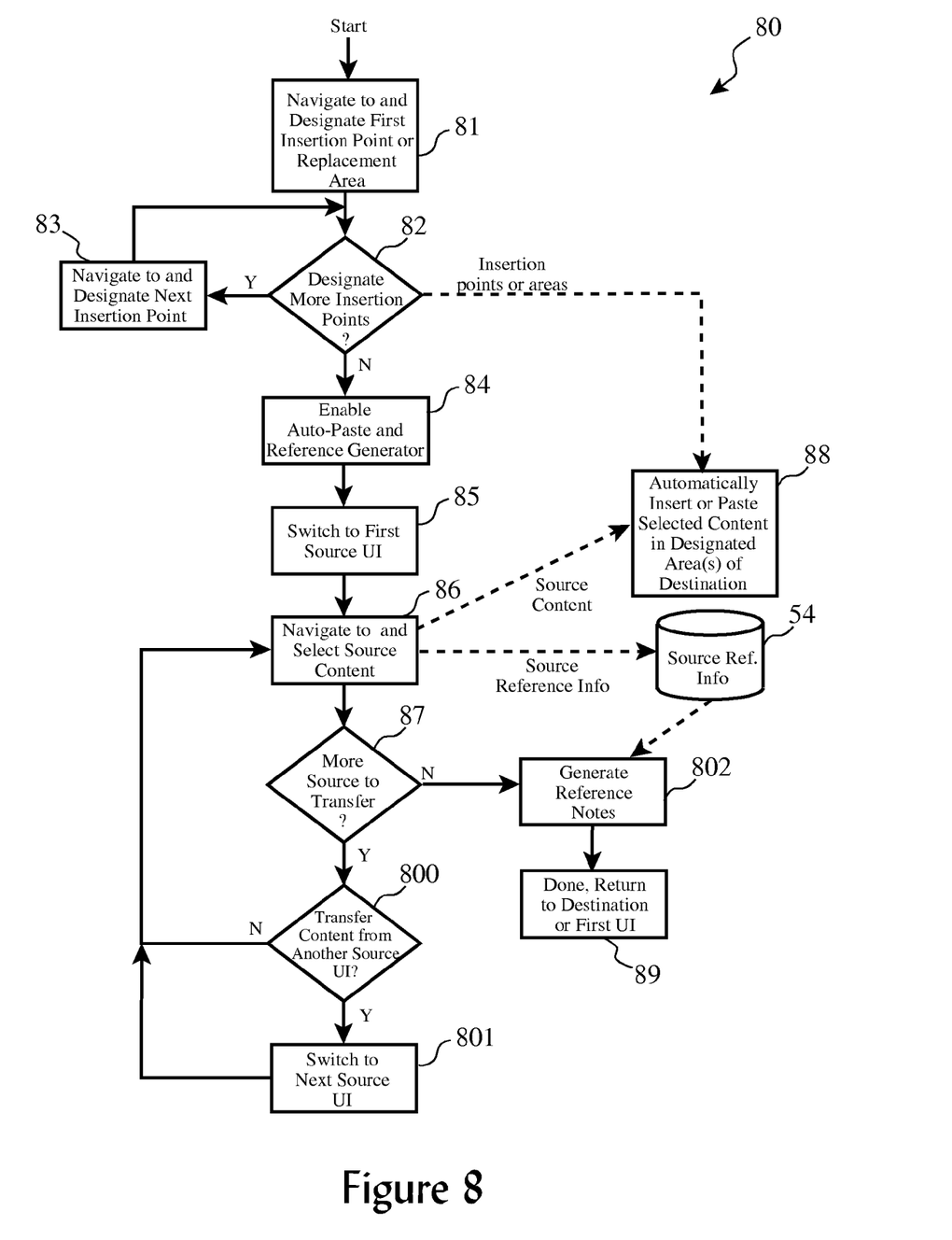
FIG. 8 provides a logical process illustrating the automatic reference noting operations as shown in FIG. 5.

Turning to FIG. 8, our logical process for capturing and recording source reference information is shown at a high level. This method may be implemented as compiled code, scripts, or interpretable code (e.g. Java, applets, servlets, etc.) in full or part within application programs, operating systems, server suites, utility programs, or proprietary code or hardware.

While creating or editing a computer resource such as a computer file or document, when a user wishes to insert or copy content from a source destination to the resource being edited, the system executes the process (80) shown. The source or sources may include points and areas within UI's of other programs and system functions, as well as within the destination resource which is being created or edited.

Initially, the user may navigate (81) to a first insertion point and optionally highlight an insertion area to designate a first "paste" destination while in the current (destination) UI. If (82) more than one insertion points or areas are desired, the user may navigate to and select (83) additional destinations while still in the destination UI. Insertion points can be marked in a variety of ways, including placement of a graphical icon such as a caret ("^") at the insertion point(s) or other suitable icon. Replacement destination areas can be marked in a variety of ways, including highlighting the selected text, graphics, information, or content in a special pattern, color, or both, or by making special changes to the selected information itself (e.g. changing the text to a different color, underlining the text, etc.). Preferably, a user interface or dialog box is also provided to allow the user to manage destination insertion points and replacement areas, such as to create additional points and areas, and to remove points and areas.

When all destination points and areas have been designated, the user enables (84) the automatic content transfer function of the invention through an appropriate user control such as right-clicking with the mouse to bring up a dialog box, selecting an option from a drop-down list, or operating a special icon, key or key sequence. The user may be allowed to select advanced options, such as rules for concatenation or content conversion, or whether cutting (e.g. source deletion) is performed as well as copying on each subsequent selection operation.

Next, the user switches (85) to the first UI from which source information is to be transferred, navigates to the first source point, and highlights or selects (86) source content, which is then automatically copied into the transfer buffer and pasted (88) into the designated destination point(s) and area(s), without need to switch back to the destination UI. Additionally, the source reference information (54) for this transfer is recorded, such as the time and date of the transfer, the user's identification, the author of the information, a source indicator such as a file name or web address, the destination resource, and the publication date of the source information.

If (87) more source content is to be transferred, the user may continue to navigate to additional points and to select (86) additional content for automatic pasting into the destination resource from within the current UI, or the user may switch (800, 801) to another UI and proceed with selecting (86) for automatic pasting (88) into the destination resource.

When (87) all source information has been copied, the collected source reference information (54) is made available to a reference note generator (802), and the information transfer operation is complete (89). The user now returns to the initial (e.g. destination) UI to continue editing or creating (21') the computer resource.

Of course, as will be recognized by those skilled in the art, the use of text as the content copied from a source to a destination in the foregoing examples is not meant to imply that the present invention is limited to such content types. In fact, it may be used to transfer content of any format which is compatible with the transfer buffer implementation. For example, video clips, graphics, hyperlinks, audio clips, and the like may be handled by the invention provided that the transfer buffer is implemented in a manner compatible with storing such information.

Figure 6:
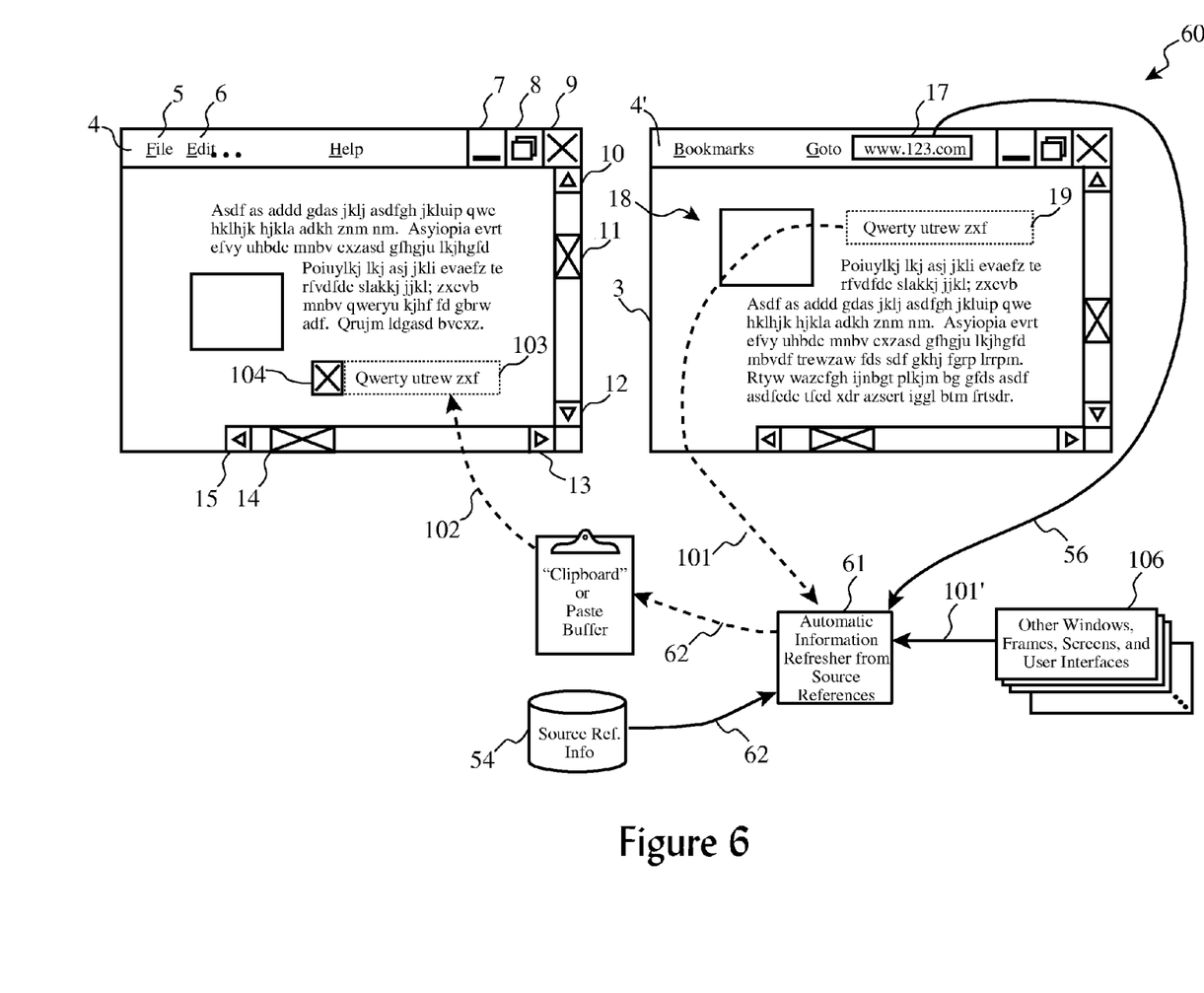
FIG. 6 illustrates our process of automatically refreshing or updating quoted information from their original sources or references.

Turning now to FIG. 6, an illustration of our process (60) to automatically refresh or update a composition with the most recent information from the sources of original information is shown. An automatic refresher (61) accesses the source reference information records (54), then retrieves the latest available information from each of those sources (e.g. from each quoted web page, file, etc.), and provides them into an updated copy of the destination via the clipboard or transfer buffer. This can be accomplished through a number of conventional means such as macro executions, dynamically generated scripts, or embedding of OLE links into the source reference information records.

Figure 7:
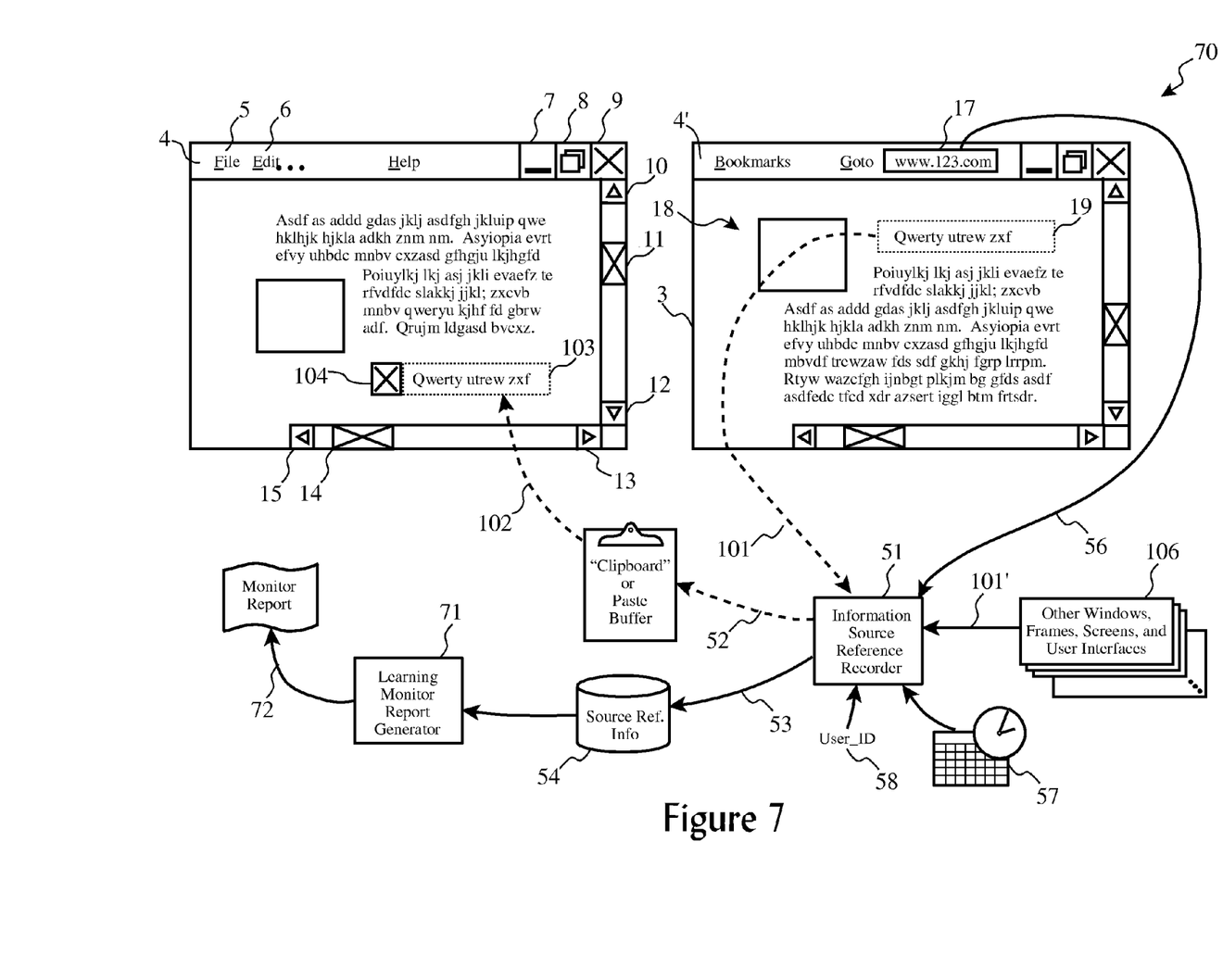
FIG. 7 depicts our process of collecting source reference information during copying, cutting and pasting, and similar information transfer operations, which is then used to automatically generate a monitor report for use in online learning experiences.

As shown in FIG. 7, our process (70) for monitoring online learning experiences is similar to the process of FIG. 6, with the exception that the captured and recorded source reference information (54) is rendered into a human-readable form such as an email report (72) by a report generator (71). For the previous example of Table 1, the report may look something like:

---

Online Learning Monitor Ver. 1.0
Student: Danny
Quoting and Copying Actions:
    - copied "Qwerty utrew zxf" from "www.123.com" on April 15, 2003
      at 18:36:03 into page 1, line 8, "my_essay.doc"
End of Report

---

This text report may be sent to an administrator using a method such as email or facsimile, or may be stored for future retrieval and review by the administrator such as in a text file or database. The monitoring function may be executed in the "foreground" with the possible knowledge of the student, or may be executed in the background in a manner concealed from the student in order to survey the student's activities unknowingly. Optionally, an online learning administrator provided with a Graphical User Interface ("GUI") through which he or she may view multiple reports for a single student, reports for a set of students, and enable sorting, filtering and perform searching against institutional policies and rules to find violators. For example, using such a GUI, an administrator may specify to search and sort on all students in a class who exceeded a maximum number of allowed links visited while completing their essay composition. In another example, the administrator may sort and filter all student reports to see which students visited or used web sites and sources which were unrelated to the course, or which were not approved for use.

Figure 9:
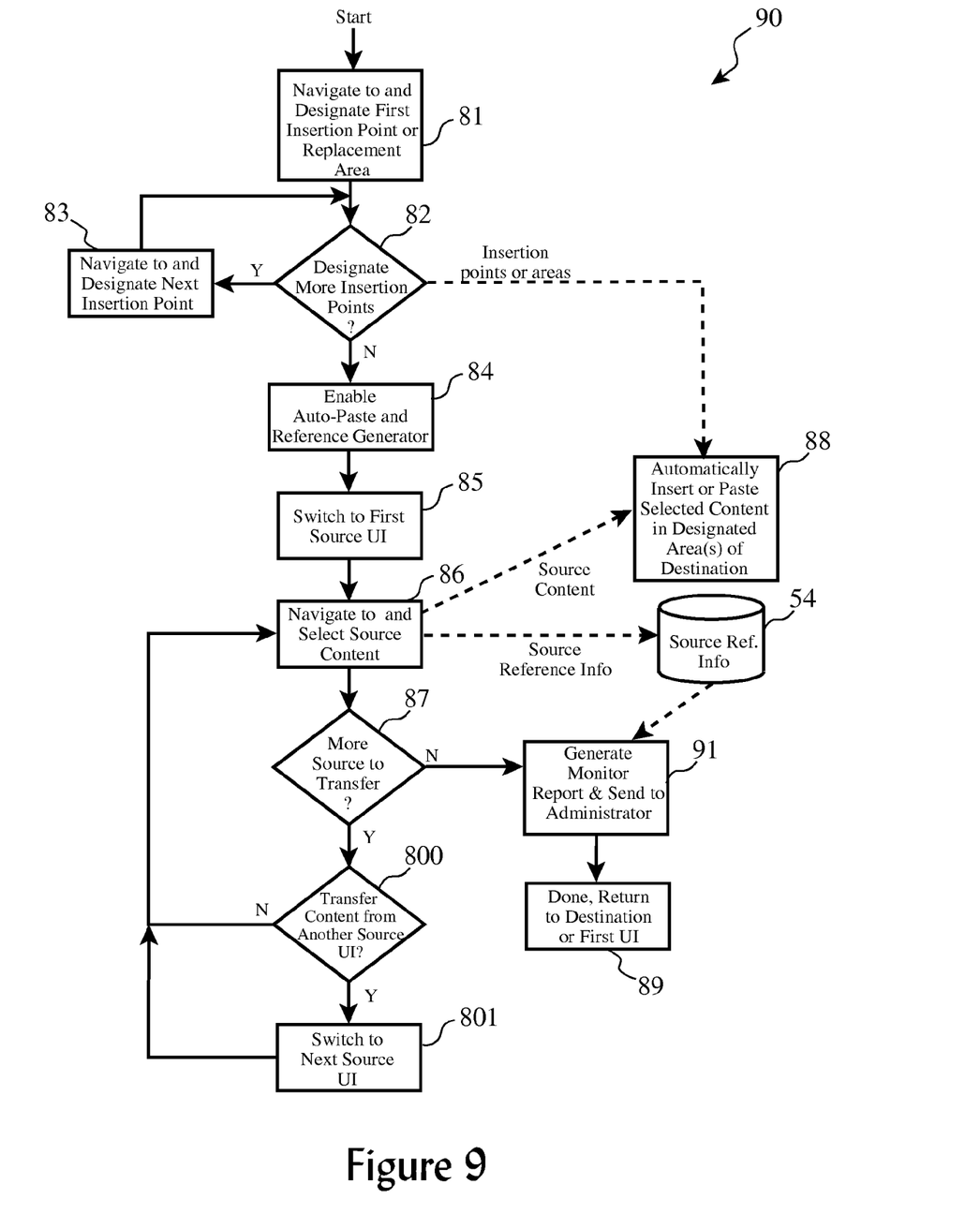
FIG. 9 provides a logical process illustrating the online learning monitor operations as shown in FIG. 5.

Our logical process (90) of monitoring an online learning experience is shown in more detail in FIG. 9. This method may be implemented as compiled code, scripts, or interpretable code (e.g. Java, applets, servlets, etc.) in full or part within application programs, operating systems, server suites, utility programs, or proprietary code or hardware.

While creating or editing information for an online learning exercise such as completing an essay or writing a composition document on a computer, when a user wishes to insert or copy content from a source destination to the resource being edited, the system executes our process (90). The source or sources may include points and areas within UI's of other programs and system functions, as well as within the destination resource which is being created or edited.

Initially, the user may navigate (81) to a first insertion point and optionally highlight an insertion area to designate a first "paste" destination while in the current (destination) UI. If (82) more than one insertion points or areas are desired, the user may navigate to and select (83) additional destinations while still in the destination UI. Insertion points can be marked in a variety of ways, including placement of a graphical icon such as a caret ("^") at the insertion point(s) or other suitable icon. Replacement destination areas can be marked in a variety of ways, including highlighting the selected text, graphics, information, or content in a special pattern, color, or both, or by making special changes to the selected information itself (e.g. changing the text to a different color, underlining the text, etc.). Preferably, a user interface or dialog box is also provided to allow the user to manage destination insertion points and replacement areas, such as to create additional points and areas, and to remove points and areas.

When all destination points and areas have been designated, the user enables (84) the automatic content transfer function of the invention through an appropriate user control such as right-clicking with the mouse to bring up a dialog box, selecting an option from a drop-down list, or operating a special icon, key or key sequence. The user may be allowed to select advanced options, such as rules for concatenation or content conversion, or whether cutting (e.g. source deletion) is performed as well as copying on each subsequent selection operation.

Next, the user switches (85) to the first UI from which source information is to be transferred, navigates to the first source point, and highlights or selects (86) source content, which is then automatically copied into the transfer buffer and pasted (88) into the designated destination point(s) and area(s), without need to switch back to the destination UI. Additionally, the source reference information (54) for this transfer is recorded, such as the time and date of the transfer, the user's identification, the author of the information, a source indicator such as a file name or web address, the destination resource, and the publication date of the source information.

If (87) more source content is to be transferred, the user may continue to navigate to additional points and to select (86) additional content for automatic pasting into the destination resource from within the current UI, or the user may switch (800, 801) to another UI and proceed with selecting (86) for automatic pasting (88) into the destination resource.

When (87) all source information has been copied, the collected source reference information (54) is used to generate (91) a monitor report such as a text file, print out, or email message. The user now returns to the initial (e.g. destination) UI to continue editing or creating (21') the computer resource.

As previously mentioned and as will be recognized by those skilled in the art, the use of text as the content copied from a source to a destination in the foregoing examples is not meant to imply that the present invention is limited to such content types. In fact, it may be used to transfer content of any format which is compatible with the transfer buffer implementation. For example, video clips, graphics, hyperlinks, audio clips, and the like may be handled by the invention provided that the transfer buffer is implemented in a manner compatible with storing such information.

In conclusion, the present invention may be realized in a variety formats, programming languages, methodologies, and operating systems on a variety of computing platforms without departure from the spirit and scope of the present invention. Therefore, the scope of the present invention should be determined by the following claims.

What is claimed is:

1. A computer program product for automatically generating a reference note in an electronic document when directly quoting information from another electronic document, the computer program product comprising:
one or more computer-readable tangible storage devices;
program instructions, stored on at least one of the one or more storage devices, to receive a first user-selected insertion point or replacement area from
a first user interface to a destination electronic document;
program instructions, stored on at least one of the one or more storage devices, to, subsequent to receiving the first insertion point, provide a source user interface to a user-selected source electronic document;
program instructions, stored on at least one of the one or more storage devices, to, subsequent to providing the source user interface, receive a user selection of text content to be transferred from the source user interface to the first insertion point or replacement area;
program instructions, stored on at least one of the one or more storage devices, to, subsequent to receiving the user selection of content, automatically copy the selected content to a transfer buffer without requiring the user to return to the first user interface;
program instructions, stored on at least one of the one or more storage devices, to
automatically capture and record one or more source reference
data items corresponding to the selected content simultaneously with
or subsequent to automatically copying the selected content to a transfer buffer; and
program instructions, stored on at least one of the one or more storage devices, to
automatically generate in the destination electronic document at least one reference note selected from the group consisting of a footnote, an endnote, a table of references entry, and a bibliographical entry containing the recorded source reference data items.

2. The computer program product as set forth in claim 1 wherein the program instructions to automatically capture and record one or more source reference data items capture at least one source identifier selected from the group consisting of a file name, a path name, a folder name, a server name, a Uniform Resource Locator, and a network address.

3. The computer program product as set forth in claim 1 wherein the program instructions to automatically capture and record one or more source reference data items capture a system time, a system date, or both a system time and date.

4. The computer program product as set forth in claim 1 wherein the program instructions to automatically capture and record one or more source reference data items capture an author identifier for the source information.

5. The computer program product as set forth in claim 1 wherein the program instructions to automatically capture and record one or more source reference data items capture a user identifier.

6. The computer program product as set forth in claim 1 wherein the program instructions to automatically capture and record one or more source reference data items capture a publication date for the source information.

7. A computer system for generating a reference note in an electronic document when directly quoting information from another electronic document, the computer system comprising:

one or more processors, one or more computer-readable memories and one or more computer-readable tangible storage devices;

program instructions, stored on at least one of the one or more storage devices for execution by at least one of the one or more processors via at least one of the one or more memories, to receive a user-selected first insertion point or replacement area designation received from a first user interface to a destination electronic document;

program instructions, stored on at least one of the one or more storage devices for execution by at least one of the one or more processors via at least one of the one or more memories, to display a second user interface subsequent to receiving the first insertion point or replacement area designation, the second user interface being configured to allow a user to manipulate a source electronic document;

program instructions, stored on at least one of the one or more storage devices for execution by at least one of the one or more processors via at least one of the one or more memories, to receive from a user a selection of an amount text content in the source electronic document via the second user interface to be quoted from the source user interface to the first insertion point or replacement area;

program instructions, stored on at least one of the one or more storage devices for execution by at least one of the one or more processors via at least one of the one or more memories, to, subsequent receiving the selection, automatically copy the selection to a transfer buffer;

program instructions, stored on at least one of the one or more storage devices for execution by at least one of the one or more processors via at least one of the one or more memories, to capture and record one or more source reference data items corresponding to the selection simultaneously with or subsequent to copying the selection content; and program instructions, stored on at least one of the one or more storage devices for execution by at least one of the one or more processors via at least one of the one or more memories, to generate in the destination electronic document one or more human-readable reference notes containing the captured source reference data items, the one or more reference notes being selected from the group consisting of a footnote, an endnote, a table of references entry, and a bibliographical entry.

8. The computer system as set forth in claim 7 wherein the program instructions to capture and record one or more source reference data items capture and record one or more source identifier selected from the group consisting of a file name, a path name, a folder name, a server name, a Uniform Resource Locator, and a network address.

9. The computer system as set forth in claim 7 wherein the program instructions to capture and record one or more source reference data items capture and record a system time, a system date, or both a system time and date.

10. The computer system as set forth in claim 7 wherein the program instructions to capture and record one or more reference data items capture an author identifier for the copied selection.

11. The computer system as set forth in claim 7 wherein the program instructions to capture and record one or more reference data items capture a user identifier.

12. The computer system as set forth in claim 7 wherein the program instructions to record a reference data item to capture a publication date for the copied selection.

* * * * *